United States Patent [19]
Ohgami et al.

[11] Patent Number: 5,905,550
[45] Date of Patent: May 18, 1999

[54] DISPLAY DEVICE HAVING A CASING CONTAINING A DISPLAY PANEL, AND PORTABLE APPARATUS HAVING THE DISPLAY DEVICE

[75] Inventors: Keizo Ohgami; Masashi Mikami; Kenichi Ishikawa, all of Tokyo, Japan

[73] Assignee: Kabushiki Kaisha Toshiba, Kanagawa-ken, Japan

[21] Appl. No.: 08/771,031

[22] Filed: Dec. 20, 1996

[30] Foreign Application Priority Data

May 9, 1996 [JP] Japan ................................ 8-114923

[51] Int. Cl.⁶ ........................... G02F 1/1333; H05K 5/00
[52] U.S. Cl. ........................ 349/58; 361/681; 361/683; 349/84
[58] Field of Search ...................... 349/58, 84; 361/681, 361/683

[56] References Cited

U.S. PATENT DOCUMENTS

| | | | |
|---|---|---|---|
| 4,926,365 | 5/1990 | Hsieh | 361/681 |
| 5,243,549 | 9/1993 | Oshiba | 361/683 |
| 5,379,183 | 1/1995 | Okonsky et al. | 361/681 |
| 5,494,447 | 2/1996 | Zaidan | 361/683 |
| 5,583,529 | 12/1996 | Satou | 361/681 |

*Primary Examiner*—William L. Sikes
*Assistant Examiner*—Toan Ton
*Attorney, Agent, or Firm*—Limbach & Limbach, LLP

[57] ABSTRACT

A display device comprises a box-shaped casing having an opening for display, and a display unit contained in the casing, the display unit having a display screen exposed to the opening. The casing includes a display cover and a display mask coupled to the display cover and having the opening. The display cover and display mask have outer peripheral edge portions, respectively, which are detachably coupled to each other. The display unit is provided with a plurality of support portions extending toward the outer peripheral edge portions. The support portions is clamped between the outer peripheral edge portion of the display cover and the outer peripheral edge portion of the display mask, whereby the display unit is fixed in the casing.

5 Claims, 7 Drawing Sheets

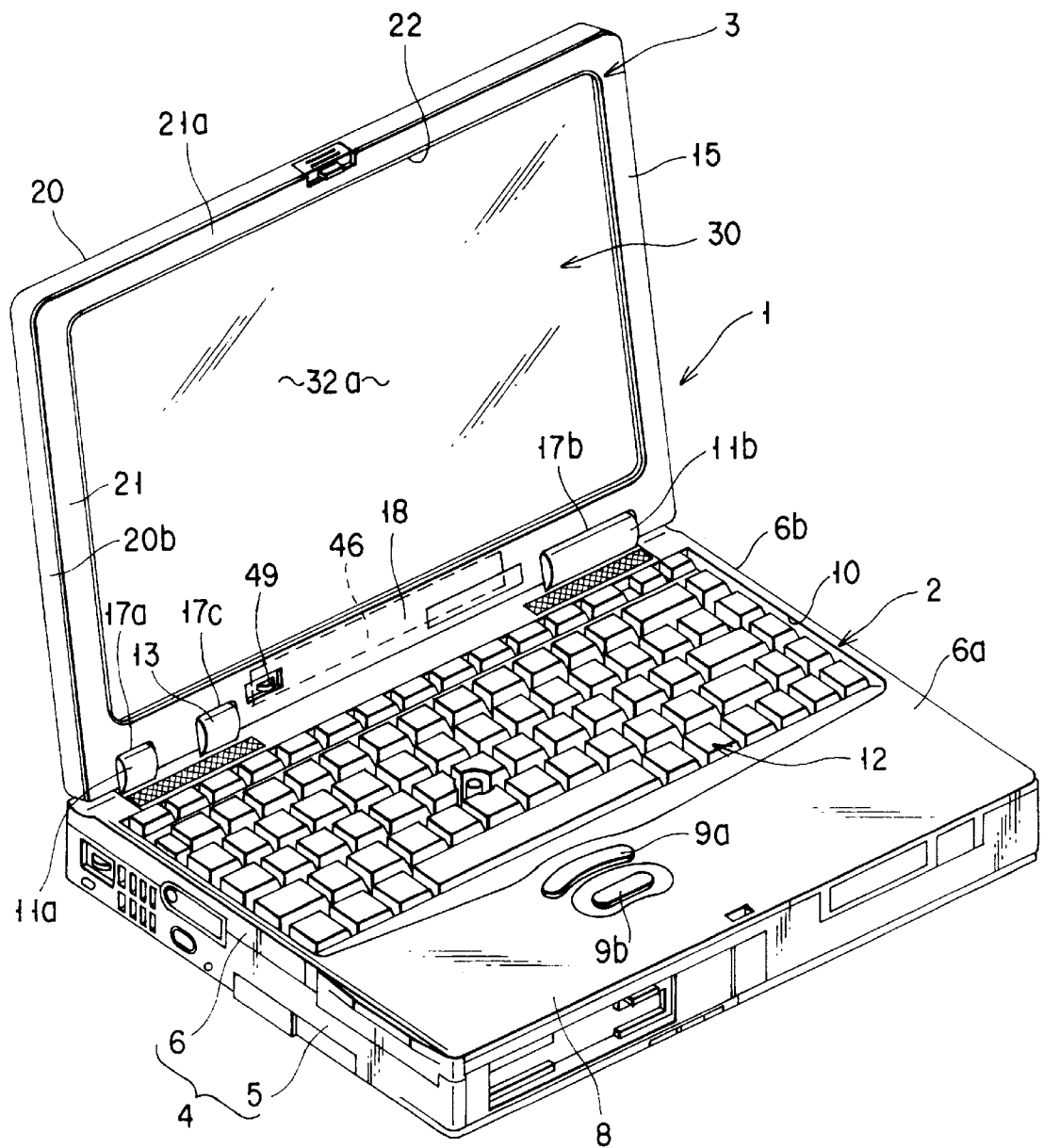
F I G. 1

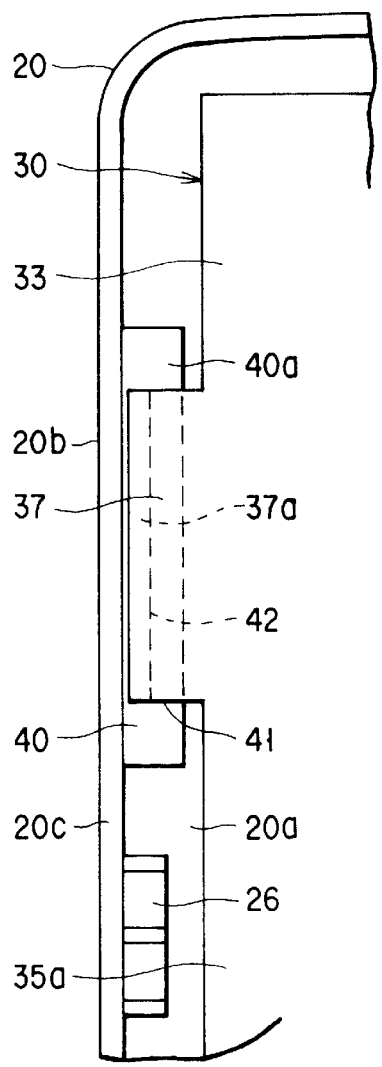
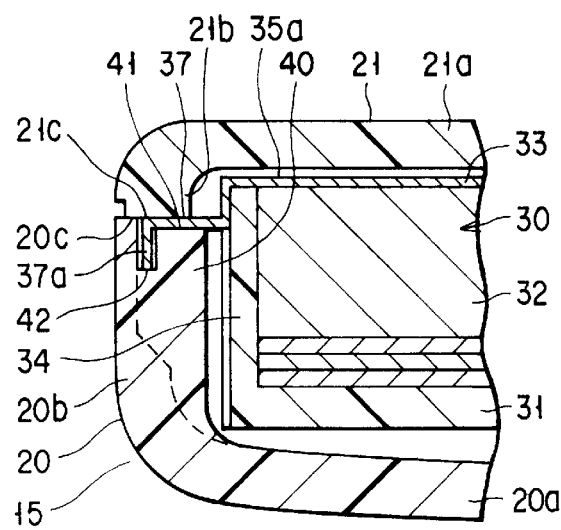
F I G. 4
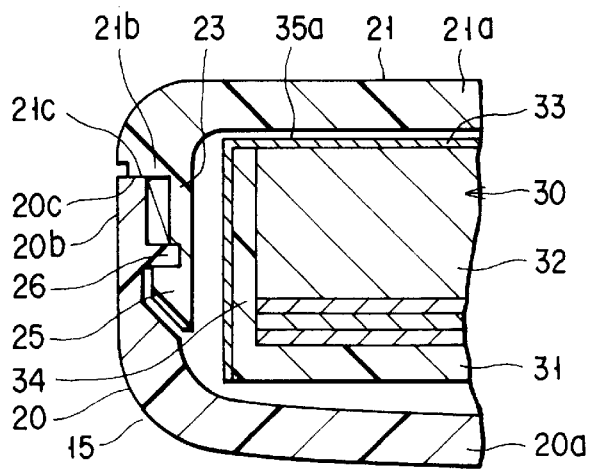
F I G. 3
F I G. 5

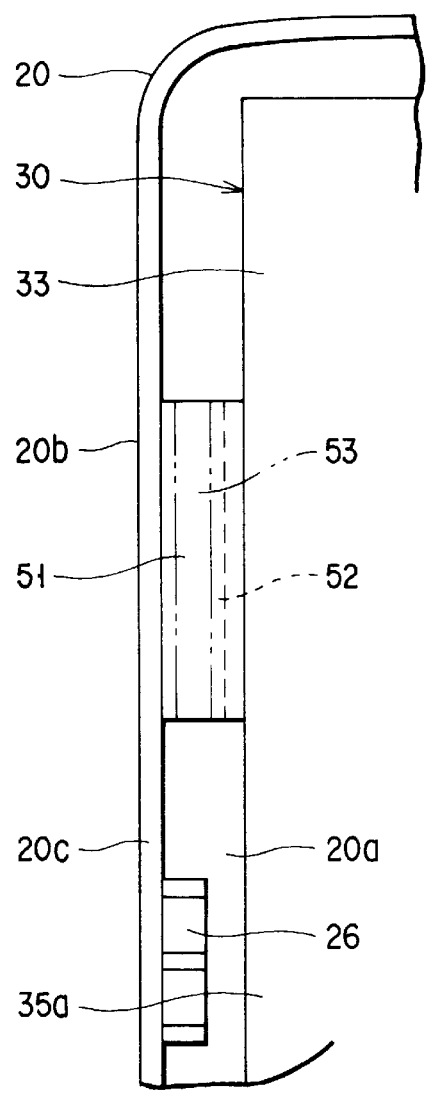
F I G. 7
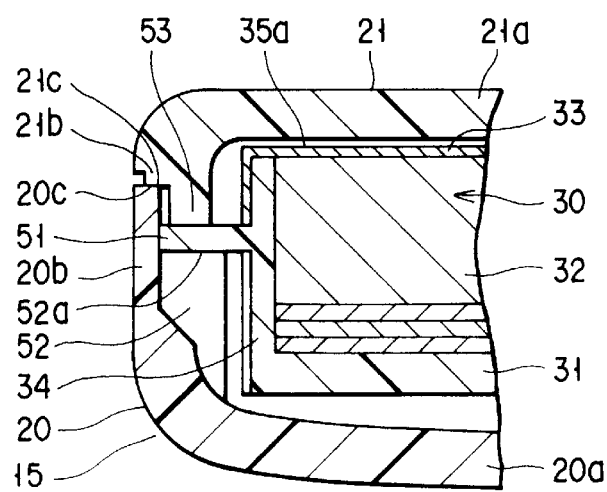
F I G. 8

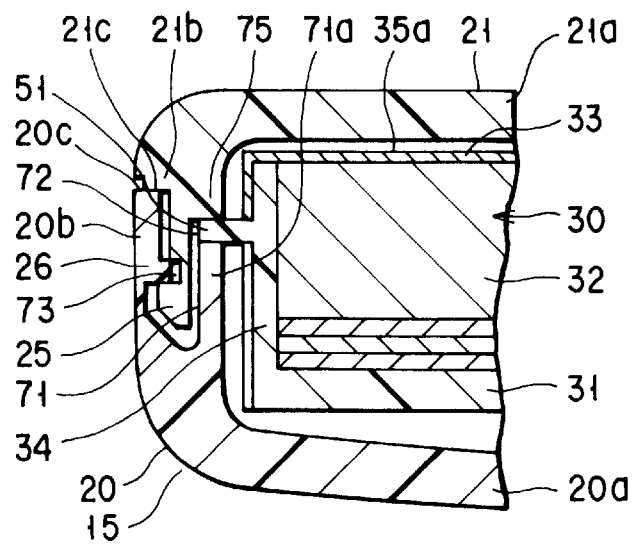
F I G. 1 2
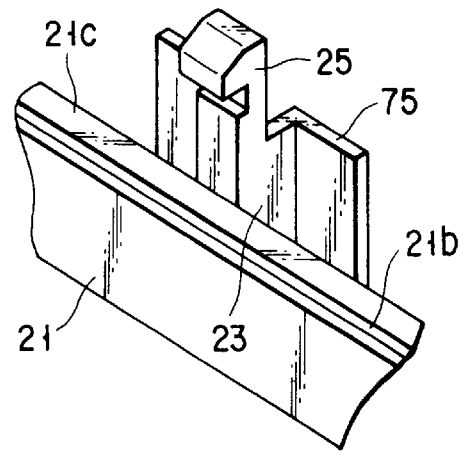
F I G. 1 3
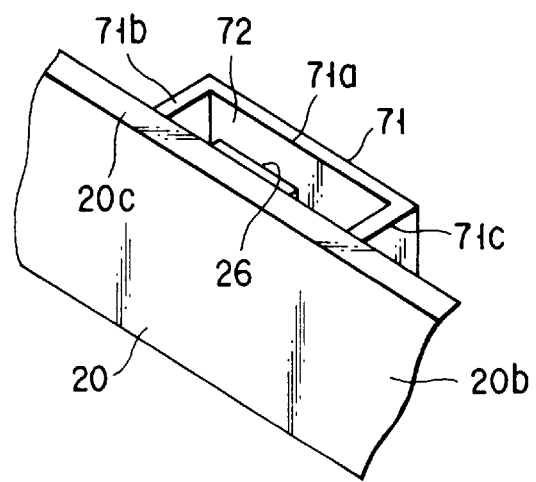
F I G. 1 4

DISPLAY DEVICE HAVING A CASING CONTAINING A DISPLAY PANEL, AND PORTABLE APPARATUS HAVING THE DISPLAY DEVICE

BACKGROUND OF THE INVENTION

The present invention relates to a display device having a box-shaped casing and a display unit contained in the box-shaped casing, and a portable apparatus such as a portable computer having the display device, and more particularly to a structure for fixing the display unit to the casing.

A portable apparatus represented by a portable computer comprises a main body having a keyboard, and a liquid crystal display (LCD) device supported on the main body. The LCD device has a box-shaped flat casing containing a display unit.

The casing has a display cover and a display mask coupled to the display cover. A display opening is formed in the front surface of the display mask. The display unit has a frame of a synthetic resin and a liquid crystal (LC) panel supported on the frame. The LC panel has a rectangular display screen for displaying characters and images. The display screen of the LC panel is exposed to the outside of the casing through the display opening.

In a conventional LCD device, the display unit is supported on the display cover of the casing. The display cover comprises a rectangular bottom wall and four peripheral walls continuous with an outer peripheral portion of the bottom wall. The display unit is contained inside the four peripheral walls. A plurality of columnar boss portions are formed on the inner surface of the bottom wall. The boss portions are located at positions corresponding to the four corner portions of the display unit. The display unit has a plurality of flange-like support portions, and these support portions protrude to the lateral sides of the frame at the four corners of the frame. The support portions are screwed down on the upper surfaces of the boss portions and thereby the display unit is fixed on the display cover.

Recently developed portable computers have been applied to multimedia more and more, and various multimedia information such as characters, sounds and images has been easily processed. Under the circumstances, the LCD device is required to have a larger display screen with enhanced resolution.

In the conventional LCD device, the display unit is fixed to the casing by screwing the flange-like support portions down on the boss portions provided on the bottom wall of the display cover. With this structure, however, the fixing portions for fixation between the boss portions and support portions are located between the display unit and the peripheral walls of the display cover. Thus, the space for containing the support portions and boss portions needs to be provided between the display unit and the peripheral walls of the display cover. As a result, the inside of the casing has a dead space extending in the width direction of the display unit.

Since the width dimension of the casing is predetermined, the size of the display unit is limited by the degree corresponding to the dead space. In the conventional LCD device, the space within the casing for mounting the display unit is thus limited, and the size of the display screen cannot be increased any more.

BRIEF SUMMARY OF THE INVENTION

The present invention has been made in consideration of the above circumstances, and its object is to provide a display device capable of containing a display unit with a greater size without increasing the size of a casing of the display device, with screws for fixing the display unit being dispensed with, resulting in a decrease in the number of parts, and to provide a portable apparatus having the display device.

In order to achieve the above object, the present invention provides a display device comprising:

a box-shaped casing having an opening for display; and a display unit contained in the casing, the display unit having a display screen exposed to the opening, wherein the casing includes a display cover and a display mask coupled to the display cover and provided with the opening, the display cover and the display mask having outer peripheral edge portions, respectively, which are detachably coupled to each other, and the display unit is provided with a plurality of support portions extending toward the outer peripheral edge portions, the support portions being clamped between the outer peripheral edge portion of the display cover and the outer peripheral edge portion of the display mask, whereby the display unit is fixed in the casing.

According to this structure, there is no need to dispose boss portions for receiving the support portions in the vicinity of the display unit, or to provide a space for fixing the display unit in the casing. Thus, the display unit can be enlarged up to positions adjacent to the outer peripheral edge portions of the display cover and display mask, and the display screen can be enlarged, as compared to the prior art.

Furthermore, there is no need to provide boss portions for receiving the support portions, or screws for fixing the support portions. Accordingly, the number of parts can be reduced and the structure of the casing simplified.

In order to achieve the above object, this invention also provides a display device comprising:

a box-shaped casing having an opening for display; and a display unit contained in the casing, the display unit having a display screen exposed to the opening, and a plurality of support portions projecting outward from an outer peripheral portion of the display screen, wherein the casing includes a display cover and a display mask coupled to the display cover and provided with the opening, the display cover and the display mask having outer peripheral edge portions, respectively, which are detachably coupled to each other, and the outer peripheral edge portion of the display cover has a plurality of seat portions on which the support portions are abutted, and the outer peripheral edge portion of the display mask has a plurality of pushing portions cooperating with the seat portions in clamping and holding the support portions.

According to this structure, the support portions of the display unit can be firmly clamped between the seat portions of the display cover and the pushing portions of the display mask. Thus, the display unit can be firmly fixed within the casing.

In addition, there is no need to dispose boss portions for receiving the support portions in the vicinity of the display unit, or to provide a space for fixing the display unit in the casing. Thus, the display unit can be enlarged up to positions adjacent to the outer peripheral edge portions of the display cover and display mask, and the display screen can be enlarged, as compared to the prior art.

Furthermore, there is no need to provide boss portions for receiving the support portions, or screws for fixing the support portions. Accordingly, the number of parts can be reduced and the structure of the casing simplified.

In order to achieve the above object, this invention also provides a portable apparatus comprising:

a main body having on an upper surface thereof means for inputting information; and a display device supported on the main body, the display device comprising a box-shaped casing having an opening for display, and a display unit contained in the casing, the display unit having a display screen exposed to the opening, wherein the casing includes a display cover and a display mask coupled to the display cover and provided with the opening, the display cover and the display mask having outer peripheral edge portions, respectively, which are detachably coupled to each other, and the display unit is provided with a plurality of support portions extending toward the outer peripheral edge portions, the support portions being clamped between the outer peripheral edge portion of the display cover and the outer peripheral edge portion of the display mask, whereby the display unit is fixed in the casing.

According to this structure, there is no need to dispose boss portions for receiving the support portions in the vicinity of the display unit, or to provide a space for fixing the display unit in the casing. Thus, the display unit can be enlarged up to positions adjacent to the outer peripheral edge portions of the display cover and display mask, and the display screen can be enlarged, as compared to the prior art.

Furthermore, there is no need to provide boss portions for receiving the support portions, or screws for fixing the support portions. Accordingly, the number of parts can be reduced and the structure of the casing simplified.

In order to achieve the above object, this invention provides a portable apparatus comprising:

a main body having on an upper surface thereof input means for inputting information; and a display device supported on the main body, the display device being rotatable between a first position where the display device covers the input means and a second position where the input means is exposed, wherein the display device comprises a box-shaped casing having an opening for display; a display unit contained in the casing, the display unit having a display screen exposed to the opening; and a circuit board contained in the casing and electrically connected to the display unit, the casing includes a display cover and a display mask coupled to the display cover and provided with the opening, the display cover and the display mask having outer peripheral edge portions, respectively, which are detachably coupled to each other, the display unit is provided with a plurality of support portions extending toward the outer peripheral edge portions, the support portions being clamped between the outer peripheral edge portion of the display cover and the outer peripheral edge portion of the display mask, whereby the display unit is fixed in the casing, and the circuit board is located below the display unit and situated horizontal along the width of the display unit when the display device is set in the second position.

According to this structure, there is no need to dispose boss portions for receiving the support portions in the vicinity of the display unit, or to provide a space for fixing the display unit in the casing. Thus, the display unit can be enlarged up to positions adjacent to the outer peripheral edge portions of the display cover and display mask, and the display screen can be enlarged, as compared to the prior art.

Since the circuit board is not disposed on the lateral sides of the display unit, the presence of the circuit board does not prevent the display unit from being enlarged in the width direction of the casing. Therefore, the display unit with a larger display screen can be contained in the casing, with the size of the casing unchanged.

Furthermore, since the support portions of the display unit are clamped between the outer peripheral edge portions of the display cover and display mask, there is no need to provide boss portions for receiving the support portions, or screws for fixing the support portions. Accordingly, the number of parts can be reduced and the structure of the casing simplified.

In order to achieve the above object, this invention provides a portable apparatus comprising:

a casing having a box-like shape; and a packaged functional component contained in the casing, wherein the casing includes a first cover and a second cover coupled to the first cover, the first and second covers having outer peripheral edge portions, respectively, which are detachably coupled to each other, and the functional component is provided with a plurality of support portions extending toward the outer peripheral edge portions, the support portions being clamped between the outer peripheral edge portion of the first cover and the outer peripheral edge portion of the second cover, whereby the functional component is fixed in the casing.

According to this structure, there is no need to dispose boss portions for receiving the support portions in the vicinity of the functional component, or to provide a space for fixing the functional component in the casing.

In addition, there is no need to provide boss portions for receiving the functional component, or screws for fixing the support portions. Accordingly, the number of parts can be reduced and the structure of the casing simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 5 show a first embodiment of the present invention; in which

FIG. 1 is a perspective view showing a portable computer in a state in which a display device is rotated and set in a second position;

FIG. 2 is a partially cut-out plan view of a casing of the display device;

FIG. 3 is an enlarged plan view of a portion III in FIG. 2;

FIG. 4 is a cross-sectional view of the display device, showing a fixing portion for fixation between a color LC display and the casing; and FIG. 5 is a cross-sectional view of the display device, showing a coupling portion between the display cover and the display mask;

FIGS. 6 to 8 show a second embodiment of the invention; in which

FIG. 6 is a partially cut-out plan view of a casing of a display device;

FIG. 7 is an enlarged plan view of a portion VII in FIG. 6;

FIG. 8 is a cross-sectional view of the display device, showing a fixing portion for fixation between a color LC display and the casing;

FIGS. 12 to 14 show a sixth embodiment of the invention; in which FIG. 12 is a cross-sectional view of a display device, showing a fixing portion for fixation between a color LC display and a casing;

FIG. 13 is an enlarged perspective view of a first engaging claw of a display mask; and FIG. 14 is an enlarged perspective view of a second engaging claw of a display cover.

DETAILED DESCRIPTION OF THE INVENTION

Figure 2:
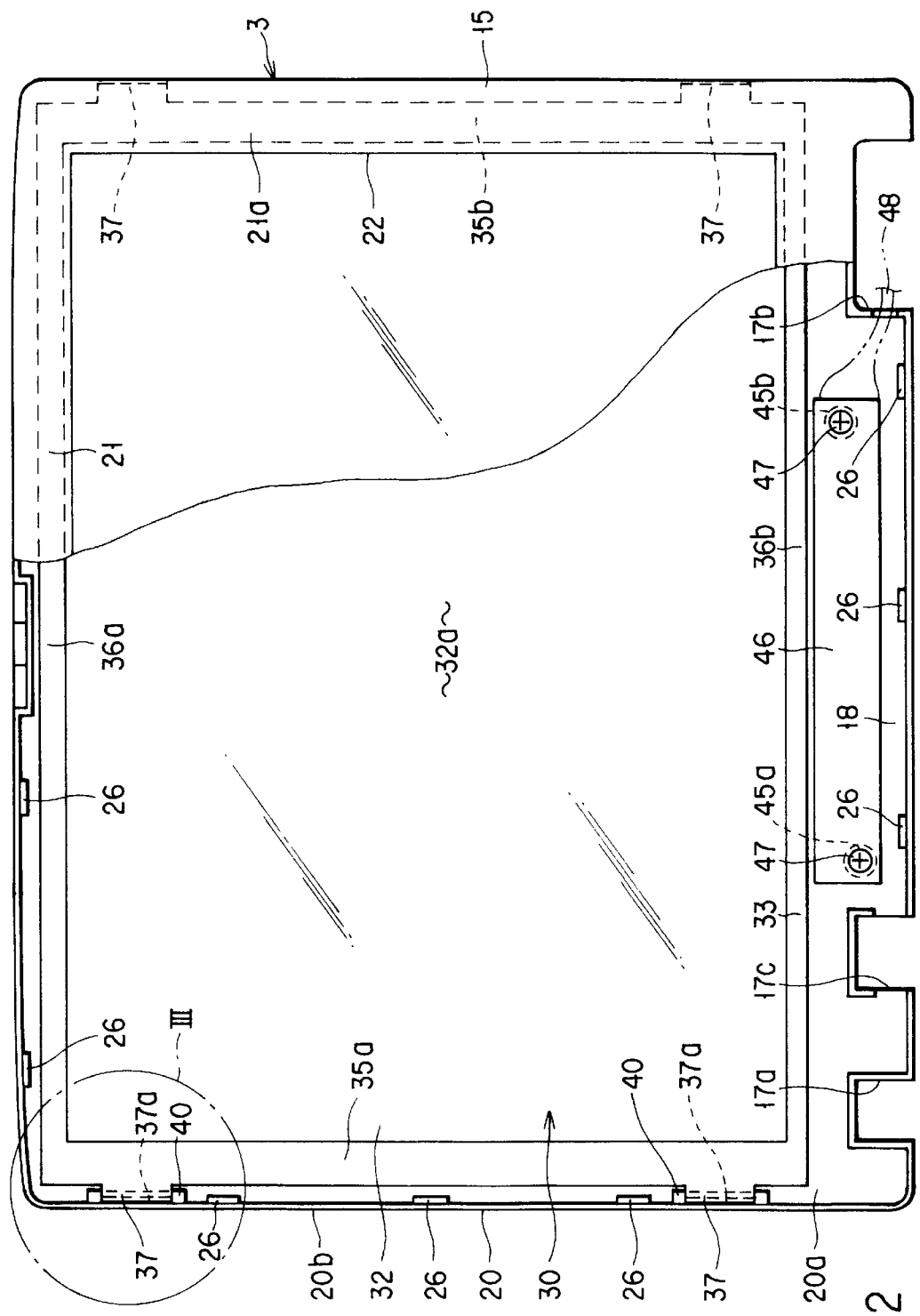

A first embodiment of the present invention, in which the invention is applied to a portable computer, will now be described with reference to FIGS. 1 to 5.

FIG. 1 shows a book-type portable computer 1 of "A4" size. The computer 1 comprises a main body 2 and a display device 3 supported on the main body 2.

The main body 2 has a housing 4 formed of a synthetic resin. The housing 4 comprises a base 5 and an upper cover 6 coupled to the base 5, and has a flat box shape. The upper cover 6 includes a front-half portion 6a with a flat upper surface and a rear-half portion 6b continuous with the front-half portion 6a. The upper surface of the front-half portion 6a functions as an armrest 8. A pair of click switch buttons 9a and 9b are provided at a substantially middle portion of the armrest 8.

The rear-half portion 6b of upper cover 6 has a keyboard mount portion 10 and a pair of support projections 11a and 11b. The keyboard mount portion 10 is formed in an upper surface of the rear-half portion 6b, and a keyboard 12 is mounted in the keyboard mount portion 10. The support projections 11a and 11b project upward from the upper surface of the rear-half portion 6b. The support projections 11a and 11b are spaced apart in the width direction of the housing 4 on the rear side of the keyboard 12. A cable guide 13 is attached to the rear-half portion 6b of the upper cover 6. The cable guide 13 projects upward from the upper surface of the rear-half portion 6b of upper cover 6 between the support projections 11a and 11b. The cable guide 13 is deviated toward one of the support projections, 11a.

The display device 3 has a casing 15. The casing 15 is formed of a synthetic resin and has a flat box shape. The casing 15 has first to third recess portions 17a to 17c. The first to third recess portions 17a to 17c are located at one end portion of the casing 15, adjacent to the upper surface of the rear-half portion 6b of upper cover 6. The first and second recess portions 17a and 17b are spaced apart in the width direction of the upper cover 6. The support projections 11a and 11b are put in the first and second recess portions 17a and 17b. The third recess portion 17c is located between the first and second recess portions 17a and 17b. The cable guide 13 is put in the third recess portion 17c.

As is shown in FIGS. 1 and 2, the casing 15 has a board support section 18. The board support section 18 is located between the second and third recess portions 17b and 17c and extends in the width direction of the casing 15.

The casing 15 is rotatably supported on the rear end portion of the housing 4 by means of a hinge device (not shown). The casing 15 is rotatable between a first position where the casing 15 covers the armrest 8 and keyboard 12, and a second position where the armrest 8 and the keyboard 12 are exposed. When the casing 15 is rotated and set in the second position, the board support section 18 is located at the lower end portion of the casing 15, adjacent to the upper surface of the rear-half portion 6b of upper cover 6.

As is shown in FIGS. 1 to 5, the casing 15 comprises a display cover 20 and a display mask 21 coupled to the display cover 20. The display cover 20 has a rectangular flat bottom wall 20a, and a peripheral wall 20b continuous with an outer peripheral portion of the bottom wall 20a. The peripheral wall 20b extends continuously in the circumferential direction of the bottom wall 20a. The display mask 21 has a substantially flat rectangular front wall 21a. The front wall 21a faces the bottom wall 20a. The front wall 21a has a display opening 22. The opening 22 has a size covering substantially the entire area of the front wall 21a. The front wall 21a has an outer peripheral portion facing an edge portion of the peripheral wall 20b. The outer peripheral portion of the front wall 21a has a projection 21b integrally. The projection 21b extends in the circumferential direction of the front wall 21a and surrounds the opening 22.

The display cover 20 and display mask 21 are detachably coupled to each other by abutting the peripheral wall 20b and projection 21b upon each other. Specifically, as shown in FIGS. 4 and 5, the peripheral wall 20b and projection 21b have abutment faces 20c and 21c which are to be abutted upon each other. The abutment faces 20c and 21c extend continuously in the circumferential direction of the peripheral wall 20b and projection 21b. The display mask 21 has an inner wall 23 continuous with the projection 21b. When the display mask 21 is abutted upon the display cover 20, the inner wall 23 is guided inside the peripheral wall 20b of display cover 20.

A plurality of first engaging claws 25 are formed integral to the inner wall 23 of display mask 21. The first engaging claws 25 are arranged at intervals in the circumferential direction of the inner wall 23. The first engaging claws 25 are resiliently deformable in directions toward and away from the peripheral wall 20b of display cover 20.

A plurality of second engaging claws 26 are formed integral to the inner surface of the peripheral wall 20b of display cover 20. The second engaging claws 26 are arranged at intervals in the circumferential direction of the peripheral wall 20b. By abutting the display cover 20 and display mask 21 upon each other, the first engaging claws 25 are engaged with the second engaging claws 26. Thereby, the display cover 20 and display mask 21 are coupled.

As is shown in FIGS. 2, 4 and 5, a color liquid crystal (LC) display 30 serving as display unit is housed in the casing 15. The color LC display 30 comprises a back frame 31 of a synthetic resin, an LC panel 32 supported on the back frame 31, and a metallic front frame 33 supported on the back frame 31 and covering an outer peripheral portion of the LC panel 32. The LC panel 32 and front frame 33 are fixed on the back frame 31 by means of screws (not shown).

The back frame 31 has a rectangular outer peripheral wall 34. The outer peripheral wall 34 is located along the peripheral wall 20b of display cover 20 in the vicinity of the inner face of the peripheral wall 20b. The LC panel 32 has a rectangular display screen 32a for displaying characters and images. The display screen 32a is located in a region surrounded by the outer peripheral wall 34. The display screen 32a faces the opening 33 in the display mask 21.

As is shown in FIG. 2, the front frame 33 comprises a pair of vertical rims 35a and 35b and a pair of horizontal rims 36a and 36b bridging the vertical rims 35a and 35b. The vertical rims 35a and 35b are spaced apart in the width direction of the color LC display 30 and extend in the height direction of the color LC display 30. The horizontal rims 36a and 36b are spaced apart in the height direction of the color LC display 30 and extend in the width direction of the color LC display 30. Flange-like support portions 37 are integrally formed at both end portions of each of the vertical rims 35a and 35b. The support portions 37 are located near the four corners of the color LC display 30 and extend to the lateral sides of the LC panel 32. As is shown in FIGS. 3 and 4, each support portion 37 integrally includes an engaging portion 37a at a distal end thereof. The engaging portion 37a extends toward the bottom wall 20a of display cover 20.

The color LC display 30 having this structure is fixed to the casing 15, with the support portions 37 of front frame 33 clamped between the peripheral wall 20b of display cover 20 and the projection 22b of display mask 21. FIGS. 3 and 4 show in detail the fixing structure of the color LC display 30. A plurality of seat portions 40 are integrally formed on the inner surfaces of those portions of the peripheral wall 20b of display cover 20, which correspond to the support portions 37 of front frame 33. The wall thickness of each seat portion 40 is greater than that of the peripheral wall 20b, and each seat portion 40 has an end face 40a continuous with the abutment face 20c of peripheral wall 20b. The end face 40a has a recess portion 41 for engagement with the support portion 37. An engagement groove 42 is formed in a bottom face of the recess portion 41. The engaging portion 37a is detachably fitted in the engaging groove 42.

When the engaging portion 37a of support portion 37 is fitted in the engaging groove 42, the support portion 37 is flush with the end face 40a and abutment face 20c. In the state in which the display cover 20 and display mask 21 are coupled to each other, the abutment face 21c of projection 21b is in contact with the support portion 37. Accordingly, the support portions 37 of the color LC display 30 are clamped between the abutment face 21c of projection 21b and the recess portions 41 of seat portions 40. Thereby, the color LC display 30 is fixed in the casing 15.

The seat portions 40 are located near the engaging portions between the first and second engaging claws 25 and 26. Thus, the display cover 20 and display mask 21 are firmly coupled to each other at positions corresponding to the support portions 37 of color LC display 30. The support portions 37 are pressed on the abutment faces 21c of projection 21b and recess portions 41 of seat portions 40.

As is shown in FIG. 1, the board support section 18 of casing 15 is located below the color LC display 30, when the casing 15 is rotated and set in the second position. A circuit board 46 is disposed in the board support section 18. The circuit board 46 operates to drive the LC panel 32. The circuit board 46 has a rectangular shape, elongated in the width direction of the casing 15, and is electrically connected to the LC panel 32 by means of a cable (not shown).

As is shown in FIG. 2, a pair of boss portions 45a and 45b for supporting the circuit board 46 are disposed in the board support section 18. The boss portions 45a and 45b are formed on the bottom wall 20b of display cover 20. The boss portions 45a and 45b are spaced apart in the width direction of display cover 20. Both end portions of the circuit board 46 are fixed on the boss portions 45a and 45b by means of screws 47. Thus, the circuit board 46 is situated horizontal in the board support section 18.

The circuit board 46 has a cable 48. The cable 48 is led into the hosing 4 through the second recess portion 17b of casing 15 and the inside of the support projection 11b of upper cover 6.

In addition, a dial 49 is disposed on the front wall 21a of display mask 21, as shown in FIG. 1. The dial 49 is used to adjust the contrast on the display screen 32a. When the casing 15 is set in the second position, the dial 49 is located below the display screen 32a and faces the operator.

According to the above structure, the color LC display 30 is fixed in the casing 15, with the support portions 37 being clamped between the abutment face 21c of display mask 21 and the abutment face 20c of display cover 20 including seat portions 40. There is no need to provide special boss portions for receiving the support portions 37 between the color LC display 30 and the peripheral wall 20b of display cover 20, and there is no need to provide a space for fixing the color LC display 30 inside the casing 15.

Accordingly, the outer peripheral wall 34 of back frame 31 of color LC display 30 can be situated along the peripheral wall 20b of display cover 20. Thus, the LC panel 32 supported on the back frame 31 can be elongated in the width direction of casing 15. With the size of the casing 15 unchanged, the display screen 32a of LC panel 32 can be enlarged and advantageously applied to the computer 1 which processes multimedia information, in particular.

Furthermore, according to the above structure, the boss portions for supporting the color LC display 30 need not be provided on the display cover 20, and screws for fixing the color LC display 30 on the boss portions can be dispensed with. Thus, the structure of the display cover 20 can be made simpler and the cost and weight of the computer 1 can be decreased.

Since the engaging portion 37a provided at the distal end portion of the support portion 37 is engaged in the engaging groove 42 of the associated seat portion 40, displacement between the support portion 37 and seat portion 40 or shaping of the support portion 37 can be prevented. Thus, the color LC display 30 can be exactly situated at a desired position within the casing 15.

In addition, the support portions 37 of color LC display 30 are located near the engagement region for engagement between the first engaging claws 25 and second engaging claws 26. Thus, the display cover 20 and display mask 21 are firmly coupled at positions corresponding to the support portions 37. Therefore, the support portions 37 can be clamped with no gap between the abutment face 20c of the peripheral wall 20b including seat portions 40 and the abutment face 21c of projection 21b, and the color LC display 30 can be firmly fixed in the casing 15.

Figure 6:
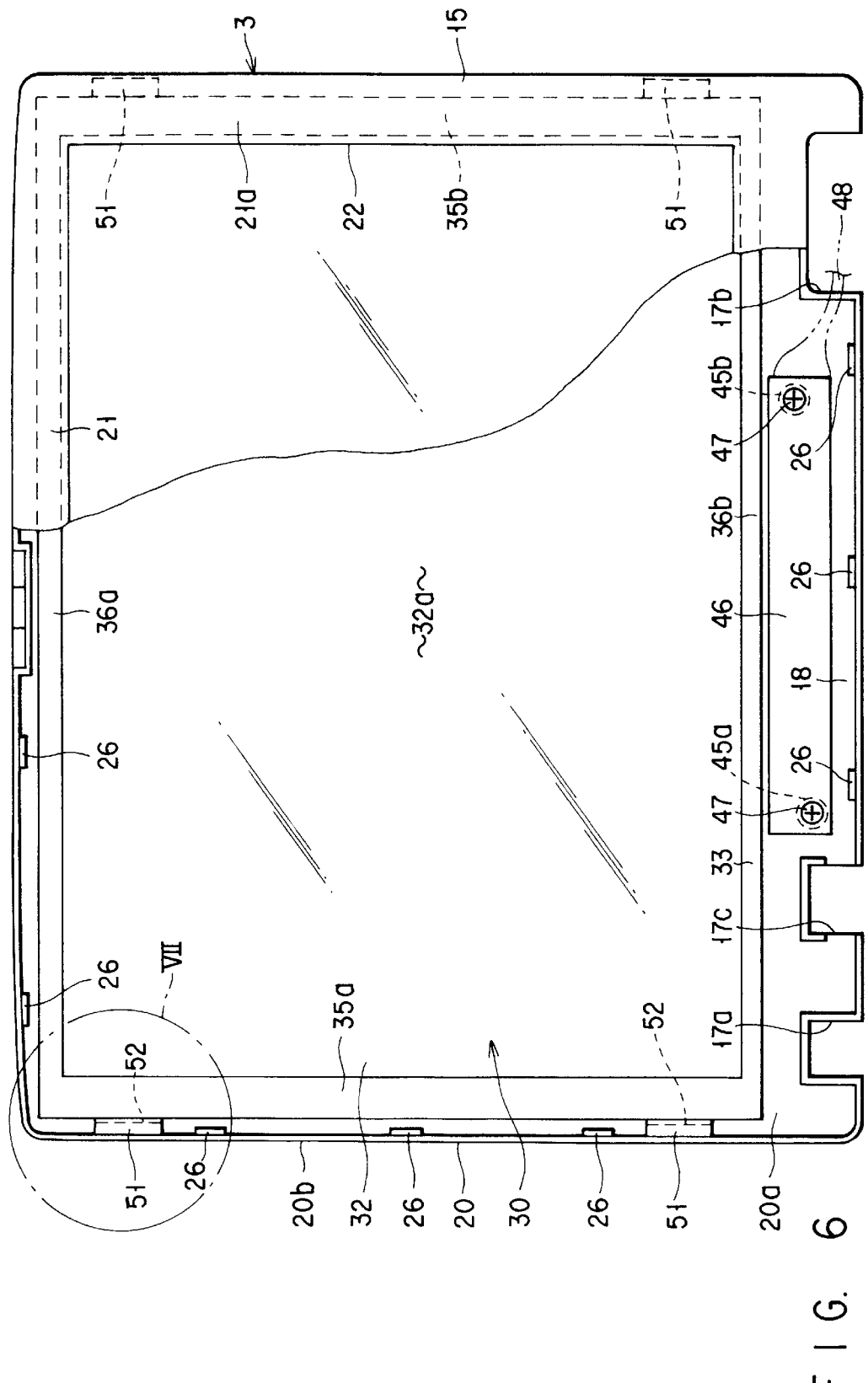

The present invention is not limited to the first embodiment. FIGS. 6 to 8 show a second embodiment of the present invention. The second embodiment differs from the first embodiment mainly with respect to the structure for fixing the color LC display 30 to the casing 15. The common parts between the first and second embodiments are denoted by like reference numerals, and a description thereof is omitted.

As is shown in FIGS. 6 to 8, four flange-like support portions 51 are integrally formed on the outer peripheral wall 34 of back frame 31. The support portions 51 project to the lateral sides of back frame 31 in the vicinity of four corners of the back frame 31.

A plurality of ribs 52 are integrally formed on the inner surface of the peripheral wall 20b of display cover 20. The ribs 52 are located at positions corresponding to the support portions 51. The support portions 51 are superposed on end faces 52a of ribs 52. A plurality of pushing portions 53 are integrally formed on the outer peripheral portion of the front wall 21a of display mask 21. The pushing portions 53 face the end faces 52a of support portions 51. The pushing portions 53 cooperate with the ribs 52 in clamping the support portions 51 when the display cover 20 is coupled to the display mask 21.

According to this structure, the back frame 31 for supporting the LC panel 32 can be directly fixed to the casing 15. Thus, the color LC display 30 can be secured to the casing 15 in such a way as not to shake.

Figure 9:
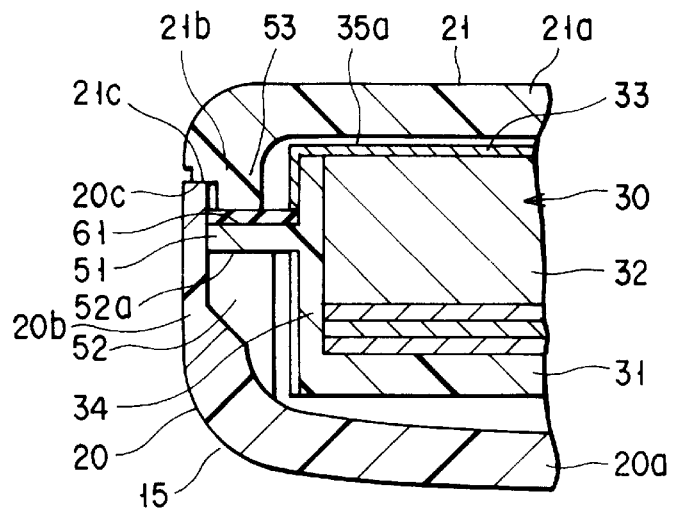
FIG. 9 is a cross-sectional view of a display device according to a third embodiment of the invention, showing a fixing portion for fixation between a color LC display and a casing.

FIG. 9 shows a third embodiment of the invention.

The third embodiment of the invention has the same structure as the second embodiment, except that rubber-like elastic sheet members 61 are interposed between the support members 51 of color LC display 30 and the pushing portions 53 of display mask 21.

According to this structure, even if a gap of a dimensional tolerance occurs between the support portion 51 and pushing portion 53, the gap can be canceled by the sheet member 61. Accordingly, the support portion 51 can be firmly clamped between the rib 52 and pushing portion 53.

Furthermore, even if shock acts on the casing 51 while the casing 51 is being rotated, the shock can be absorbed by the sheet 61. Thus, shock is not easily transmitted to the color LC display 30 and the shock-resistant properties of the color LC display 30 are enhanced.

Figure 10:
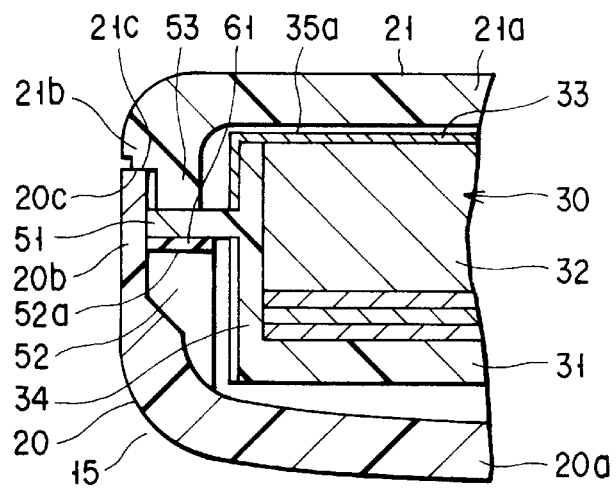
FIG. 10 is a cross-sectional view of a display device according to a fourth embodiment of the invention, showing a fixing portion for fixation between a color LC display and a casing.

FIG. 10 shows a fourth embodiment of the invention.

The fourth embodiment of the invention has the same structure as the second embodiment, except that rubber-like elastic sheet members 61 are interposed between the support members 51 of color LC display 30 and the ribs 52 of display cover 20.

According to this structure, even if a gap of a dimensional tolerance occurs between the support portion 51 and rib 52, the gap can be canceled by the sheet member 61. Accordingly, the support portion 51 can be firmly clamped between the rib 52 and pushing portion 53.

Furthermore, even if shock acts on the casing 51 of display device 3, the shock can be absorbed by the sheet member 61. Thus, shock is not easily transmitted to the color LC display 30 and the shock-resistant properties of the color LC display 30 are enhanced.

Figure 11:
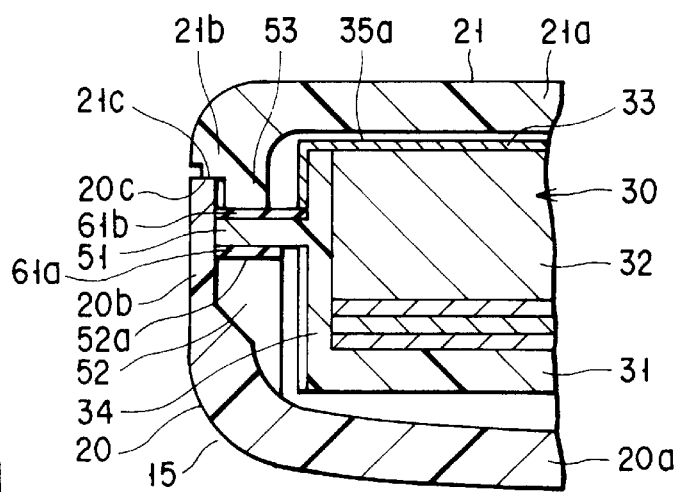
FIG. 11 is a cross-sectional view of a display device according to a fifth embodiment of the invention, showing a fixing portion for fixation between a color LC display and a casing.

FIG. 11 shows a fifth embodiment of the invention.

In the fifth embodiment of the invention, rubber-like first elastic sheet members 61a are interposed between the support members 51 of color LC display 30 and the ribs 52 of display cover 20. Similarly, rubber-like second elastic sheet members 61b are interposed between the support members 51 and the pushing portions 53 of display mask 21.

According to this structure, even if a gap of a dimensional tolerance occurs between the support portion 51 and rib 52 and between the support portion 51 and pushing portion 53, the gap can be canceled by the sheet members 61a and 61b. Accordingly, the support portion 51 can be firmly clamped between the rib 52 and pushing portion 53.

Furthermore, the color LC display 30 is rubber-mounted on the casing 15 with first and second sheet members 61a and 61b interposed. Thus, even if shock acts on the casing 51 while the computer 1 is being used or carried, the shock can be absorbed by the sheet members 61a and 61b. Thus, shock is not easily transmitted to the color LC display 30 and the shock-resistant properties of the color LC display 30 are enhanced.

FIGS. 12 to 14 show a sixth embodiment of the present invention. The structure of the sixth embodiment is the same as that of the second embodiment except for the structure for clamping the support portion 51 of color LC display 30.

As is shown in FIGS. 12 and 14, a seat portion 71 for receiving the support portion 51 is formed on the inner surface of the peripheral wall 20b of display cover 20. The seat portion 71 includes a first wall 71a extending along the peripheral wall 20b, and a pair of second walls 71b and 71c extending from both ends of the first wall 71a toward the peripheral wall 20b. The first and second walls 71a to 71c and peripheral wall 20b are combined to define a rectangular opening 72. The opening 72 is set off toward the bottom wall 20a from the abutment face 20c of peripheral wall 20b.

The second engaging claw 26 is formed on the inner surface of the peripheral wall 20b facing the opening 72. The second engaging claw 26 faces the first wall 71a and is surrounded by the first and second walls 71a to 71c. The second engaging claw 26 faces the first wall 71a, with a gap 73 interposed.

When the display cover 20 and display mask 21 are abutted upon each other, the first engaging claw 25 of display mask 21 is removably inserted into the gap 73 through the opening 72 of seat portion 71 and detachably engaged with the second engaging claw 26. Thereby, the display cover 20 and display mask 21 are coupled to each other.

The first engaging claw 25 integrally includes a pushing portion 75 which is put in contact with the support portion 51. The pushing portion 75 has a plate-like shape and faces the first wall 71a of seat portion 71 when the display cover 20 and display mask 21 are abutted upon each other. The pushing portion 75 cooperates with the first wall 71a in clamping the support portion 51. Thus, the support portion 51 is clamped between the pushing portion 75 and first wall 71a at a position corresponding to the region of engagement between the first engaging claw 25 and second engaging claw 26.

According to this structure, the support portion 51 of color LC display 30 can be clamped at the position corresponding to the region of engagement between the first engaging claw 25 and second engaging claw 26. Thus, the display cover 20 and display mask 21 are firmly coupled at the position corresponding to the support portion 51 of color LC display 30, and the support portion 51 can be firmly clamped between the pushing portion 75 and first wall 71a with no gap. Therefore, the strength of the support for the color LC display 30 can be increased.

The display device according to the present invention is applicable not only to the portable computers but also to portable apparatuses such as word processors.

In addition, the unit to be contained in the casing is not limited to the display unit. For example, it may be a hard disk drive, a floppy disk drive, a CD-ROM, or a packaged functional component such as a circuit module having a circuit board on which circuit components are mounted. Thus, the casing can be applied not only to the display device but also to the main body of the computer.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

We claim:

1. An electronic apparatus comprising:
   a main body having data input means on an upper surface thereof; and
   a display device supported on said main body, said display device comprising a casing having an opening for display, and a display unit contained in said casing, said display unit having a display screen exposed to said opening,
   wherein said casing includes a display cover and a display mask coupled to said display cover and provided with said opening, said display cover and said display mask having peripheral edge portions, respectively, which are detachably coupled to each other, and
   wherein said display unit is provided with a plurality of support portions extending toward said peripheral edge portions, said support portions being clamped between said peripheral edge portion of the display cover and said peripheral edge portion of the display mask, whereby said display unit is fixed in said casing.

2. The electronic apparatus according to claim 1, wherein said display cover has a bottom wall and a peripheral wall continuous with an outer peripheral portion of said bottom wall, said display mask has a front wall facing said bottom wall and having said opening, and a projection extending from an outer peripheral portion of the front wall toward said peripheral wall, and said peripheral wall of the display cover and the projection of the display mask have abutment faces which are abutted upon each other, said support portions being interposed between the abutment face of the display cover and the abutment face of the display mask.

3. The electronic apparatus according to claim 2, wherein the abutment face of said peripheral wall has recess portions in which said support portions are engaged.

4. The electronic apparatus according to claim 3, wherein said support portions have at their distal ends engaging portions extending toward the abutment face of said peripheral wall, and the abutment face of said peripheral wall has grooves for engagement with the engaging portions, said grooves being continuous with said recess portions.

5. The electronic apparatus according to claim 2, wherein said display cover has a plurality of first engaging claws arranged at intervals in the circumferential direction of said peripheral wall of the display cover,
   said display mask has a plurality of second engaging claws detachably engaged with said first engaging claws, said first engaging claws and said second engaging claws being engaged with each other, thereby coupling said display cover and said display mask, and said support portions are located adjacent to regions of engagement between the first engaging claws and the second engaging claws.

* * * * *